US008634200B2

(12) United States Patent
    Togashi

(10) Patent No.: US 8,634,200 B2
(45) Date of Patent: Jan. 21, 2014

(54) PORTABLE TERMINAL

(75) Inventor: Daisuke Togashi, Yokohama (JP)

(73) Assignee: Kyocera Corporation, Kyoto (JP)

( * ) Notice: Subject to any disclaimer, the term of this patent is extended or adjusted under 35 U.S.C. 154(b) by 166 days.

(21) Appl. No.: 13/130,785

(22) PCT Filed: Feb. 25, 2009

(86) PCT No.: PCT/JP2009/053462
    § 371 (c)(1),
    (2), (4) Date: Jul. 28, 2011

(87) PCT Pub. No.: WO2010/061642
    PCT Pub. Date: Jun. 3, 2010

(65) Prior Publication Data
    US 2012/0019996 A1    Jan. 26, 2012

(30) Foreign Application Priority Data

Nov. 26, 2008   (JP) .................................. 2008-301749

(51) Int. Cl.
    *H05K 5/00*    (2006.01)
(52) U.S. Cl.
    USPC ............ 361/753; 361/752; 361/730; 361/799
(58) Field of Classification Search
    USPC ............... 361/679.56, 730, 679.01, 752, 753,
                     361/796, 799, 800, 818; 379/428.01,
                     379/433.11, 433.13
    See application file for complete search history.

(56) References Cited

U.S. PATENT DOCUMENTS 5,337,061 A    8/1994  Pye et al.
    5,554,996 A    9/1996  Chatzipetros
    7,079,877 B2   7/2006  Shoji et al.
    8,060,167 B2 * 11/2011 Saitou et al. ............... 455/575.7
    8,203,493 B2 *  6/2012 Sato et al. ..................... 343/702
    2001/0051510 A1* 12/2001 Nakamura ...................... 455/90
    2004/0207558 A1  10/2004 Saito et al.
    2007/0164913 A1*  7/2007 Sakamoto et al. ............ 343/702
    2008/0020812 A1*  1/2008 Kobayashi et al. ........ 455/575.3
    2008/0143609 A1   6/2008 Mashima et al.
    2010/0277377 A1* 11/2010 Sato et al. ..................... 343/702

FOREIGN PATENT DOCUMENTS

JP            4053418 B    8/1992
    JP            5075320 A    3/1993
                  (Continued)

OTHER PUBLICATIONS

Notice of Reasons for Rejection issued to JP Application No. 2020-540398, mailed Jul. 3, 2012.

*Primary Examiner* — Hoa C Nguyen
*Assistant Examiner* — Christopher L Augustin
(74) *Attorney, Agent, or Firm* — Hoffmann & Baron, LLP

(57) ABSTRACT

A portable terminal, which has easily adjustable reception sensitivity, includes an operating section side case section (2) having a first case member (30) which forms appearance; a display section side case section (3); a circuit section (33), which is arranged on the operating section side case section (2) or the display section side case section (3), and has a ground section (31), a power feed section (32), and a signal processing section (36) connected to the power feed section (32); a first conductive section (34), which is arranged on the operating section side case section (2) and electrically connected to the ground section (31); and a second conductive section (35) which is arranged on the display section side case section (3) and electrically connected to the power feed section (32). The first conductive section (34) is formed in the first case member (30).

7 Claims, 14 Drawing Sheets

(56) References Cited

FOREIGN PATENT DOCUMENTS

| | | |
|---|---|---|
| JP | 8046416 A | 2/1996 |
| JP | 2002111343 A | 4/2002 |
| JP | 2002335180 A | 11/2002 |
| JP | 2003188620 A | 7/2003 |
| JP | 2004228790 A | 8/2004 |
| JP | 2004241939 A | 8/2004 |
| JP | 2007104468 A | 4/2007 |
| WO | 2006046714 A1 | 5/2006 |
| WO | 2006062198 A1 | 6/2006 |

* cited by examiner

PORTABLE TERMINAL

CROSS-REFERENCE TO RELATED APPLICATIONS

This application is the National Stage of International Application No. PCT/JP2009/053462, filed Feb. 25, 2009, which claims the benefit of Japanese Application No. JP 2008-301749, filed Nov. 26, 2008, the contents of all of which are incorporated by reference herein.

TECHNICAL FIELD

The present invention relates to a portable terminal having a first body and a second body.

BACKGROUND ART

Among portable terminals, there is a folding-type terminal that is configured from a first body and a second body and is configured to be able to transition from an opened state and a closed state via a hinge portion according to a usage mode. Such a folding-type portable terminal has a communication function of communicating externally via an antenna. Herein, when used by a user while performing communication, the amplification drops due to the influence of the human body according to the usage mode thereof, and thus the antenna of the portable terminal becomes unable to secure high communication quality.

Therefore, a technique to secure high communication quality irrespective of the usage mode has been proposed by supplying power to one of a first conductive portion disposed in the first body and a second conductive portion disposed in the second body, and setting the other one to ground (grounded state). For example, according to Patent Document 1, a technique is disclosed that can suppress a decline in the amplification of the antenna even if a portion is covered by the hand of the user by employing either one of the first conductive portion and the second conductive portion as an antenna, since the surface area is wide compared to a rod-type antenna.
Patent Document 1: Japanese Unexamined Patent Application, Publication No. 2002-335180

DISCLOSURE OF THE INVENTION

Problems to be Solved by the Invention

However, since the first conductive portion or the second conductive portion arranged in the first body or the second body is employed as an antenna in Patent Document 1, it may lead to complication of the structure of the first body or the second body.

The present invention has been made taking the aforementioned such problems into account, and an object thereof is to provide a portable terminal that can reduce complication of the structure of the first body or the second body while employing the first conductive portion or the second conductive portion as an antenna.

Means for Solving the Problems

In order to solve the above-mentioned problems, the portable terminal according to the present invention includes: a first body including a first case member that forms an exterior; a second body; a circuit portion disposed in either one of the first body and the second body, and including a ground portion, electric power supply portion, and signal processing unit connected to the electric power supply portion; a first conductive portion formed in the first case member, and electrically connected to the ground portion: and a second conductive portion disposed in the second body, and electrically connected to the electric power supply portion.

In addition, in the above-mentioned portable terminal, it is preferable for the first case member to be connected to the first body to be relatively movable in relation to the first body.

Moreover, in the above-mentioned portable terminal, it is preferable for the first case member to be formed from metal.

Additionally, in the above-mentioned portable terminal, it is preferable for the first case member to be a decoration case.

In order to solve the above-mentioned problems, a portable terminal according to the present invention includes: a first body; a second body including a second case member forming an exterior; a circuit portion disposed in either one of the first body and the second body, and including a ground portion, an electric power supply portion, and a signal processing unit connected to the electric power supply portion; a first conductive portion disposed in the first body, and electrically connected to the ground portion; and a second conductive portion formed in the second case member, and electrically connected to the electric power supply portion.

In addition, in the above-mentioned portable terminal, it is preferable for the second case member to be connected to the second body to be relatively movable in relation to the second body.

Moreover, in the above-mentioned portable terminal, it is preferable for the second case member to be formed from metal.

Additionally, in the above-mentioned portable terminal, it is preferable for the second case member to be a decoration case.

In order to solve the above-mentioned problems, a portable terminal according to the present invention includes: a first body including an operating surface provided by an operation unit; a second body including a display surface provided by a display unit; a circuit portion disposed in either one of the first body and the second body, and including a ground portion, an electric power supply portion, and a signal processing unit connected to the electric power supply portion; a first conductive portion disposed in the first body at an operating surface side thereof, and electrically connected to either one of the ground portion and the electric power supply portion; and a second conductive portion disposed at a surface side of the second body opposite the display surface, and electrically connected to the other one of the ground portion and the electric power supply portion.

In addition, in the above-mentioned portable terminal, it is preferable for the second body to include a second case member disposed at a surface side thereof opposite to the display surface and forming an exterior, and for the second conductive portion to be disposed at the second case member.

Effects of the Invention

According to the present invention, it is possible to reduce complication of the structure of the first body or the second body.

Figure 1:
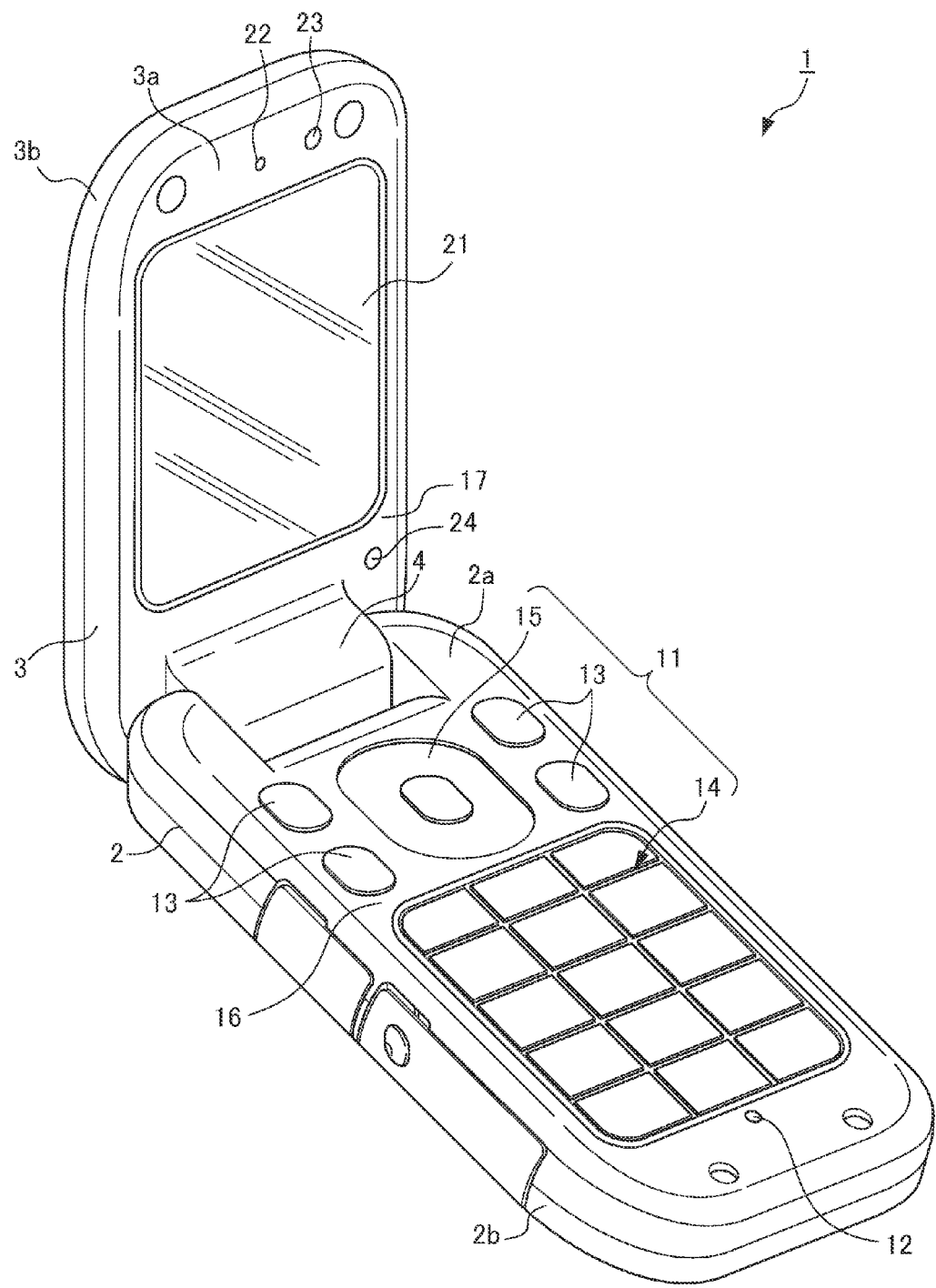
FIG. 1 is a view showing an external appearance of a cellular telephone device according to the present embodiment.

EXPLANATION OF REFERENCE NUMERALS 1 cellular telephone device
2 operation unit side body (first body)
3 display unit side body (second body)
11 operation unit
16 operation surface
17 display surface
21 display (display unit)
30 first case member
31 grounding portion
32 electric power supply portion
33 circuit portion
34 first conductive portion
35 second conductive portion
36 signal processing unit
43 second case member

PREFERRED MODE FOR CARRYING OUT THE INVENTION

Embodiments of the present invention will be explained hereinafter. FIG. 1 shows a perspective view of the external appearance of a cellular telephone device 1, which is one example of a portable terminal according to the present invention. It should be noted that, although the cellular telephone device 1 will be explained hereinafter, the present invention is not to be limited to cellular telephone devices, and may be a PHS (Personal Handyphone System), PDA (Personal Digital Assistant), portable navigation device, notebook computer or the like, for example.

As shown in FIG. 1, the cellular telephone device 1 includes an operation unit side body 2 and a display unit side body 3. The operation unit side body 2 (first body) and the display unit side body 3 (second body) are connected such that opening and closing thereof are possible via a connection portion 5 having a hinge mechanism. More specifically, an upper end portion of the operation unit side body 2 and a lower end portion of the display unit side body 3 are connected via the connection portion 4. The cellular telephone device 1 is thereby configured such that it is possible to move the operation unit side body 2 and the display unit side body 3, which are connected via the hinge mechanism, relative to each other. That is, the cellular telephone device 1 can be in a state (opened state) in which the operation unit side body 2 and the display unit side body 3 are opened, and in a state (closed state) in which the operation unit side body 2 and the display unit side body 3 are arranged to overlap each other. Here, a closed state means a state where both bodies are arranged to overlap with each other, and an opened state means a state where both bodies are arranged to not overlap with each other.

An outer surface of the operation unit side body 2 is configured by a front case 2a and a rear case 2b. The operation unit side body 2 is configured so that, at an operation surface 16 that is an outer surface on the front case 2a side thereof, a group of operation unit 11 and a voice input unit 12 as a microphone to which sounds produced by the user of the cellular telephone device 1 during a call are input are each exposed.

The operation unit 11 is configured with a function setting operation key 13 for causing various functions such as various settings, a telephone directory function, a mail function, and the like to run, an input operation key 14 for inputting numbers of a telephone number, characters of mail and the like, for example, and a decision operation key 15, which is an operation member for deciding on various operations, scrolling in up, down, left and right directions, and the like. A predetermined function is assigned to each key constituting the operation unit 11 depending on the opened or closed state of the operation unit side body 2 and the display unit side body 3, various modes, the type of application running, or the like (key assigning). Then, an operation is executed according to the function assigned to each key by the user pressing each key.

The voice input unit 12 is arranged at an outer end portion side of the operation unit side body 2 opposite to the connection portion 4 side in the longitudinal direction. That is, the voice input unit 12 is arranged at the one outer end portion side when the cellular telephone device 1 is in the opened state.

On a side face of one side of the operation unit side body 2, an interface (not illustrated) for carrying out communication with external devices (e.g., a host device) is arranged. On a side face of the other side of the operation unit side body, a side key to which a predetermined function is assigned and an interface (not illustrated) with which insertion and removal of external memory are performed are arranged. The interface is covered with a cap. Each interface is covered with a cap when not in use. The first case member 30 is arranged at the outer surface of the rear case 2b of this operation unit side body 2 (refer to FIG. 2).

Figure 3:
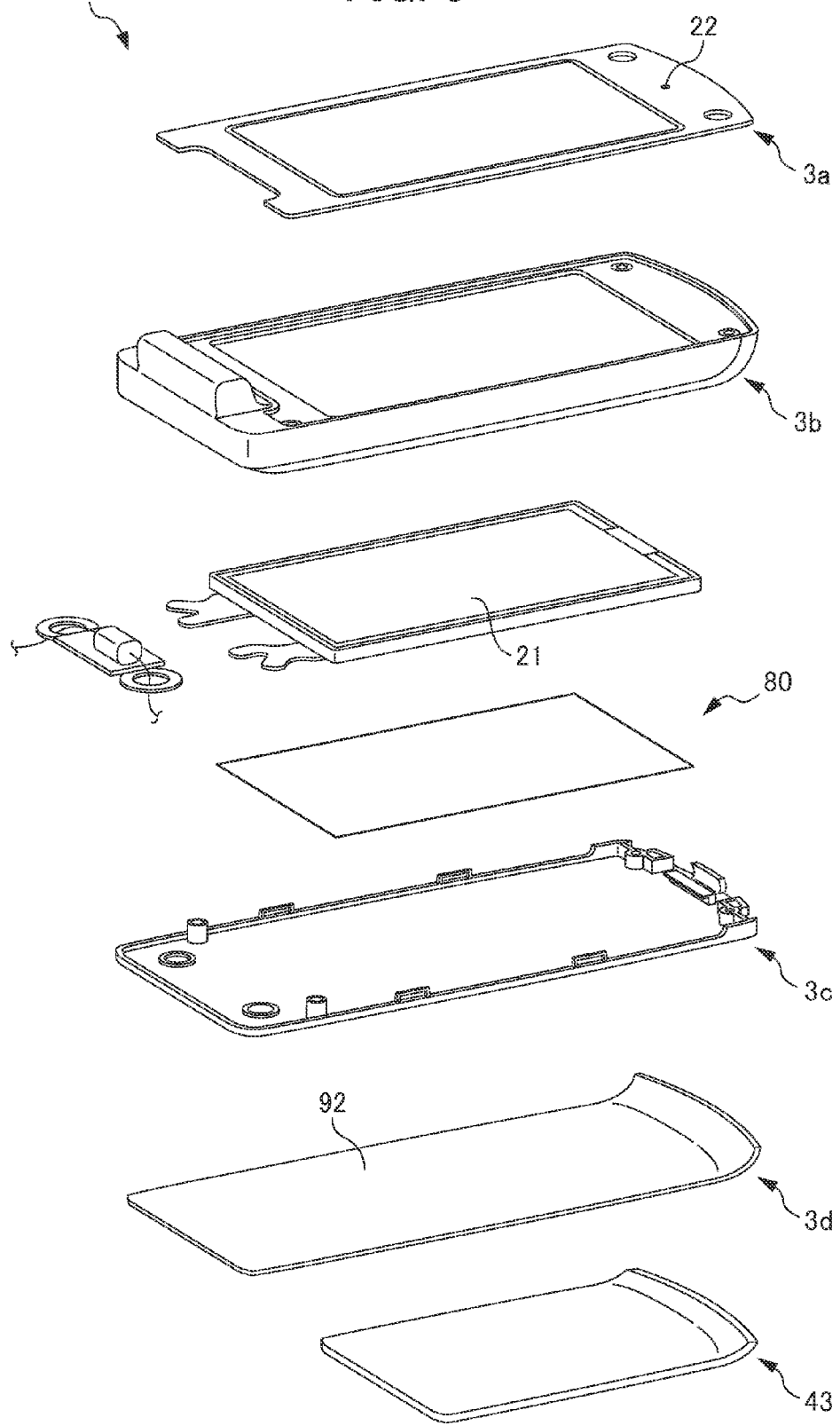
FIG. 3 is an exploded perspective view of a display unit side body of the cellular telephone device according to the present embodiment.

An outer surface of the display unit side body 3 is configured by a front panel 3a, a front case 3b, a rear case 3c, and a rear panel 3d (refer to FIG. 3). The display unit side body 3 is arranged such that a display unit 21 for displaying a variety of information, a voice output unit 22 as a receiver that outputs sound of the other party of a call, a photographing unit 23 configured by a CCD (Charge Coupled Device) camera or the like that photographs a subject, and a speaker 24 that outputs music and the like to outside are arranged in the display unit side body 3 so as to be externally exposed at the display surface 17, which is the outer surface on the front panel 3*a* side thereof. The display 21 is configured from a liquid crystal panel, a drive circuit that drives this liquid crystal panel, and a light source unit such as a back light that radiates light from a back side of this liquid crystal panel. The second case member 43 is arranged on an outer surface 18 of the rear panel 3*d* configuring the outer surface of the display unit side body 3 on an opposite side to the display surface 17.

Figure 2:
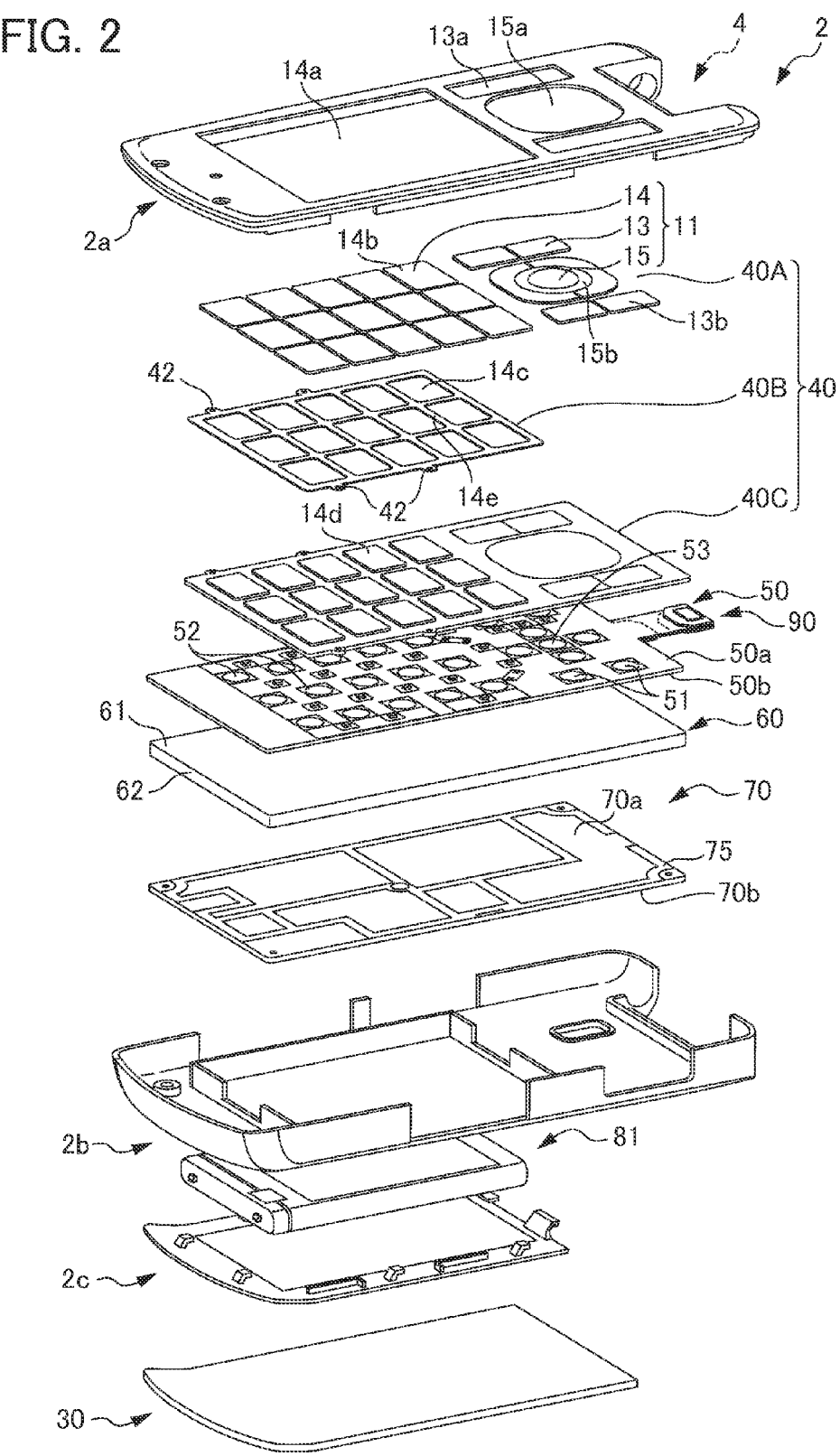
FIG. 2 is an exploded perspective view of an operation unit side body of the cellular telephone device according to the present embodiment.

FIG. 2 is an exploded perspective view of the operation unit side body 2. As shown in FIG. 2, the operation unit side body 2 includes a front case 2*a*, a key structure portion 40 (operation unit), a key substrate 50, a shielding case 60, a circuit board 70, a rear case 2*b* provided with a battery lid 2*c*, a first case member 30 and a battery 81.

The front case 2*a* and the rear case 2*b* are arranged so that their concave-shaped internal surfaces face each other and their outer circumferential edges overlap each other. In addition, the first case member 30 is connected to the outer surface of the rear case 2*b*. This first case member 30 is connected to the rear case 2*b* to be movable relatively (refer to FIG. 6). In addition, the key structure portion 40, the key substrate 50 having an FPC portion 90, the shielding case 60, and the circuit board 70 are housed between the front case 2*a* and the rear case 2*b* so as to be sandwiched therebetween.

Key holes 13*a*, 14*a* and 15*a* are formed in the front case 2*a* in an internal surface that faces the display 21 of the display unit side body 3 in a state in which the cellular telephone device 1 is folded. From each of the key holes 13*a*, 14*a* and 15*a*, a pressing surface of the function setting operation key member 13*b* constituting the function setting operation key 13, a pressing surface of the input operation key member 14*b* constituting the input operation key 14, and a pressing surface of the determination operation key member 15*b* constituting the determination operation key 15 are exposed. By pressing the pressing surfaces of thus exposed function setting operation key member 13*b*, input operation key member 14*b*, and determination operation key member 15*b*, the top of a metal dome (bowl-shaped), which is described later, provided at each of the corresponding key switches 51, 52, and 53 is pressed and contacts a switch terminal to be electrically conducted to it.

The key structure portion 40 is configured with an operation member 40A, a key frame 40B as a reinforcement member, and a key seat 40C as a sheet member.

The operation member 40A is configured with a plurality of key operation members. Specifically, it is configured with a function setting operation key member 13*b*, an input operation key members 14*b*, and a determination operation key member 15*b*. Each of the operation key members constituting the operation member 40A is adhered to the key seat 40C by sandwiching the key frame 40B described later. The pressing surface on each of the operation key members adhered to the key seat 40C is arranged to be exposed outside from each of the key holes 13*a*, 14*a* and 15*a*, as described above.

The key frame 40B is a metallic plate-shaped member in which a plurality of hole portions 14*c* are formed. The key frame 40B is a reinforcement member for preventing adverse effects to the circuit board 70 or the like due to pressing of the input operation key member 14*b*. In addition, the key frame 40B is an electrically conductive member, and functions also as a member for releasing static electricity in the input operation key member 14*b*. Convex portions 14*d* formed on the key seat 40C described later are arranged to fit to a plurality of hole portions 14*c* formed in the key frame 40B. Then, the input operation key members 14*b* adheres to the convex portions 14*d*.

The key seat 40C is a sheet-shaped member made of silicone rubber having flexibility. A plurality of convex portions 14*d* are formed in the key seat 40C as described above. The plurality of convex portions 14*d* are formed on a surface of the key seat 40C on a side where the key frame 40B is to be arranged. Each of the plurality of convex portions 14*d* is formed at a position corresponding to the key switch 52 described later.

The key substrate 50 has a plurality of key switches 51, 52 and 53 arranged on a first surface 50*a*, which is a surface on a key sheet 40C side thereof. Each of the plurality of key switches 51, 52 and 53 are arranged at a position corresponding to each operation member 40A. The key switches 51, 52 and 53 arranged at the key substrate 50 have structures that have metal domes of metallic plates sterically formed so as to have a curved bowl shape. The metal dome is configured so that when the top of its bowl shape is pressed, it contacts the switch terminal formed on an electrical circuit (not illustrated) printed on the surface of the key substrate 50 and conducts electrically. In addition, a plurality of electrode wire is formed on a side of a second surface 50*b* of the key substrate 50. This key substrate 50 is electrically connected with the circuit board 70 via the FPC portion 90 as a substrate.

The shielding case 60 is a rectangular as viewed in the plane, and is a low-profile box shape with a surface thereof on a circuit board 70 side open. This shielding case 60 includes a plate portion 61, and a rib portion that projects substantially perpendicular from a peripheral edge of this plate portion 61. The shielding case 60 is arranged so that the rib portion 62 abuts a reference potential pattern layer 75 formed on the circuit board 70. The shielding case 60 is formed from a metal material, and has electrical conductivity.

The circuit board 70 has the reference potential pattern layer 75 (first conductive portion) formed on one face 70*a* thereof. In addition, various electrical components (not illustrated) such as an RF module for cellular telephone devices and an RF circuit portion 33 (circuit portion) that performs processing on high frequency signals are mounted on this circuit board 70.

FIG. 3 is an exploded perspective view of the display unit side body 3. As shown in FIG. 3, the display unit side body 3 includes a front panel 3*a*, a front case 3*b*, the display 21, a circuit board 80 to which the display 21 is connected, a rear case 3*c*, and a rear panel 3*d*. In addition, the second case member 43 is connected to the outer surface 18 of the rear panel 3*d*. This second case member 43 is connected to the rear panel 3*d* to be movable relatively (refer to FIG. 9). In addition, the front panel 3*a*, the front case 3*b*, the display 21, the circuit board 80, the rear case 3*c*, the rear panel 3*d* and the second case member 43 are arranged in layers in the display unit side body 3.

As shown in FIG. 3, the front case 3*b* and the rear case 3*c* are arranged so that the interior faces of concave shape face each other, and are joined together so that their outer peripheral edges overlap with each other. In addition, the display 21 and the circuit board 80 are housed so as to be sandwiched between the front case 3*b* and the rear case 3*c*. Moreover, a reference potential pattern layer (second conductive portion) is formed on the circuit board 80.

Furthermore, with the cellular telephone device 1, the circuit board 80 arranged inside of the display unit side body 3 and the circuit board 70 arranged inside of the operation unit side body 2 are electrically connected between the operation unit side body 2 and the display unit side body 3 by a flexible printed circuit board (Flexible Printed Circuits: hereinafter referred to as FPC) not illustrated.

It should be noted that, although FIG. 1 shows the form of a so-called folding-type cellular telephone device, the form of the cellular telephone device according to the present invention is not particularly limited, and may be a sliding type in which one of the bodies slides to one direction from a state where the operation unit side body 2 and the display unit side body 3 are overlapped with each other; a rotating (turning) type in which one of the bodies rotates about an axis along the overlapping direction of the operation unit side body 2 and the display unit side body 3; or the like.

The cellular telephone device 1 according to the present invention configures a single antenna (dipole antenna) by the entire body thereof, and has a function of being able to easily perform adjustment of reception sensitivity by setting either side of the configuration related the operation unit side body 2 and the configuration related to the display unit side body 3 to be the radiating element of the antenna and setting the other side as the grounding portion of the antenna.

Herein, the configuration for realizing the functions will be explained referring to the schematic views shown in FIGS. 4 to 14. It should be noted that, although the antenna configured by the configuration related to the operation unit side body 2 and the configuration related to the display unit side body 3 is explained hereinafter by assuming to be an antenna that receives digital terrestrial broadcasting, for example, it is not limited thereto, and may be employed as the main antenna used in CDMA (Code Division Multiple Access) communication.

First Embodiment

Figure 4:
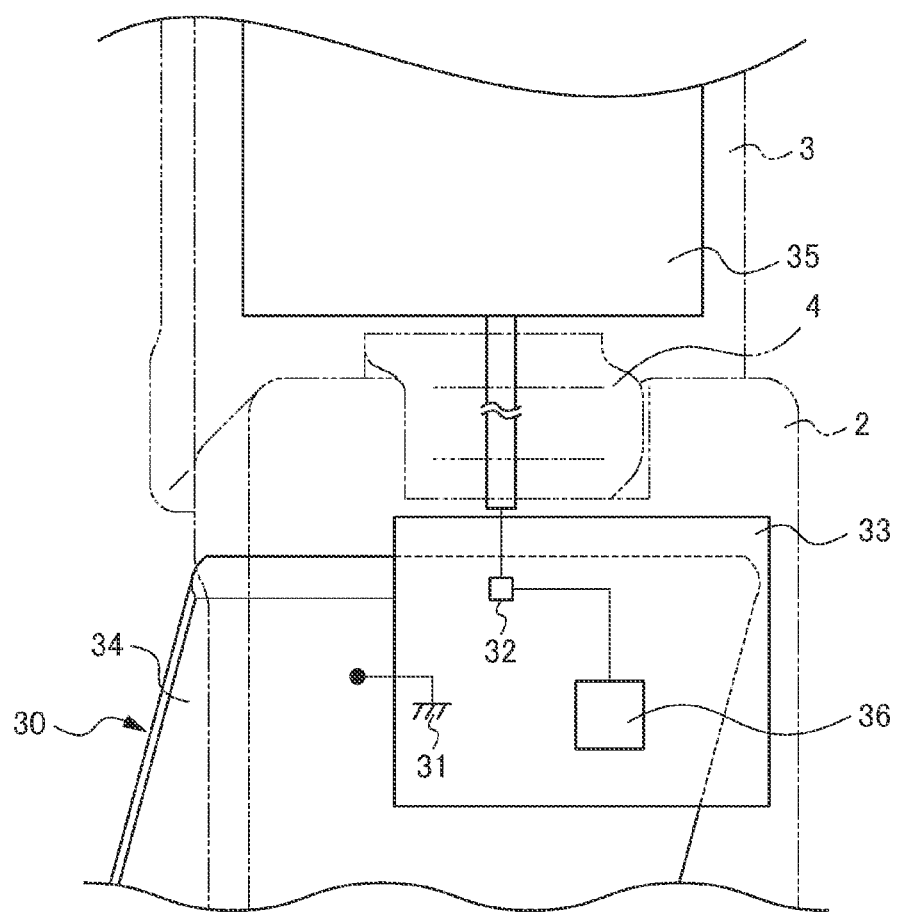
FIG. 4 is a view schematically illustrating a first configuration of the cellular telephone device according to the present embodiment.
Figure 5:
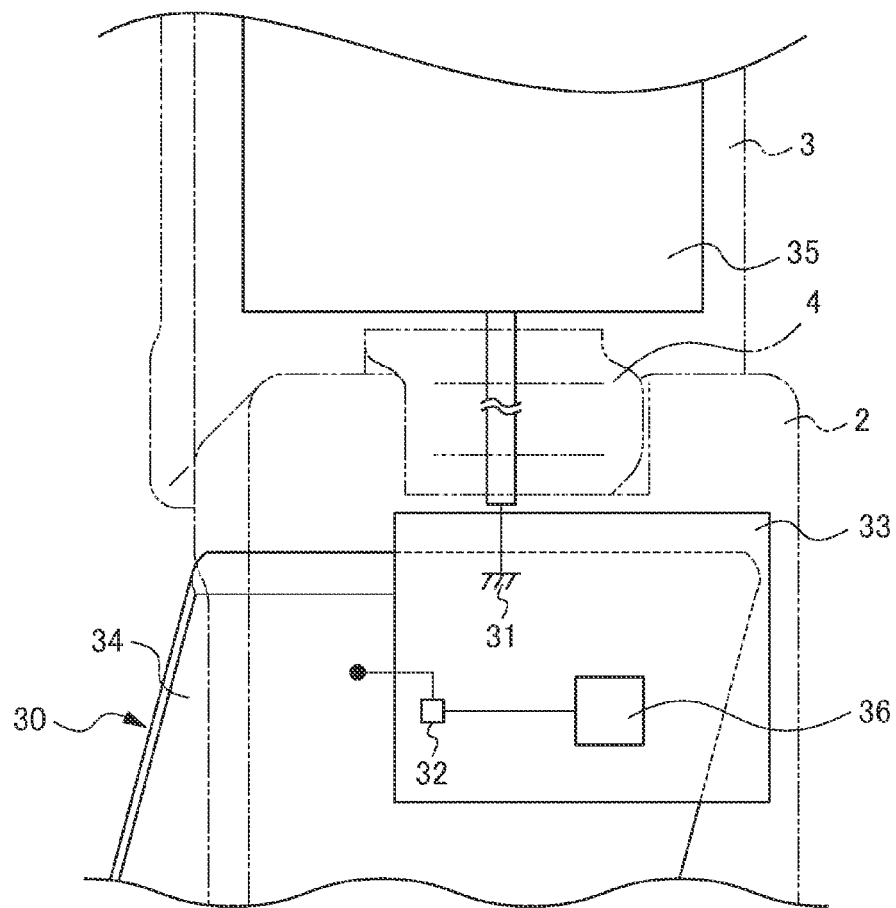
FIG. 5 is a view schematically illustrating a second configuration of the cellular telephone device according to the present embodiment.

The cellular telephone device 1 has the operation unit side body 2, the display unit side body 3, the circuit portion 33, the first conductive portion 34, and the second conductive portion 35, as shown in FIG. 4. The operation unit side body 2 includes the first case member 30 configuring the exterior thereof. It should be noted that the second conductive portion 35 is configured by the conductive members or the like forming the ground pattern of a circuit board that is not illustrated, a shielding case, and the display unit side body 3, for example.

The circuit portion 33 is arranged in either one of the operation unit side body 2 and the display unit side body 3, and has a grounding portion 31 and electric power supply portion 32, and a signal processing unit 36. The signal processing unit 36 establishes the same potential as the grounding portion 31 so that there is no influence on the antenna characteristics. The first conductive portion 34 is formed in the first case member 30, and is electrically connected to the grounding portion 31. The second conductive portion 35 is arranged in the display unit side body 3, and is electrically connected to the electric power supply portion 32. In addition, signals supplied to the electric power supply portion 32 are supplied to the signal processing unit 36 configured to include an RF circuit, and predetermined processing is executed thereon. Furthermore, the entirety of the first case member 30 may be formed by the first conductive portion 34, or a portion thereof may be formed by the first conductive portion 34.

Since the display unit side body 3 is electrically connected to the electric power supply portion 32 via the second conductive portion 35 according to such a configuration, it realizes a function as a radiating element of the antenna. In addition, the first case member 30 realizes a function as a grounding portion of the antenna due to being connected to the grounding portion 31 via the first conductive portion 34.

Therefore, since the cellular telephone device 1 can employ the first case member 30 forming the exterior of the operation unit side body 2 as the grounding portion of the antenna, simplification is possible in a case of configuring a body dipole antenna, without there leading to complication of the body internal structure. In addition, since the cellular telephone device 1 employs the first case member 30 forming the exterior of the operation unit side body 2 as the grounding portion of the antenna, an improvement in antenna characteristics can be achieved compared to a case of the grounding portion of the antenna being disposed inside of the operation unit side body 2.

It should be noted that, although it has been explained above that the grounding portion 31 is provided to the circuit portion 33, and the first conductive portion 34 is electrically connected to the grounding portion 31, it is not limited thereto. So long as the grounding portion 31 and the first conductive portion 34 are the same potential, the first conductive portion 34 may not be directly connected to the grounding portion 31.

In addition, it may be configured to set the first case member 30 as the radiating member of the antenna, and to set the operation unit side body 2 or display unit side body 3 as the grounding portion of the antenna. In a case of being configured in this way, the first conductive portion 34 is formed in the first case member 30 and is electrically connected to the signal processing unit 36 via the electric power supply portion 32, and the second conductive portion 35 is disposed in the display unit side body 3 and is electrically connected to the grounding portion 31.

Figure 6:
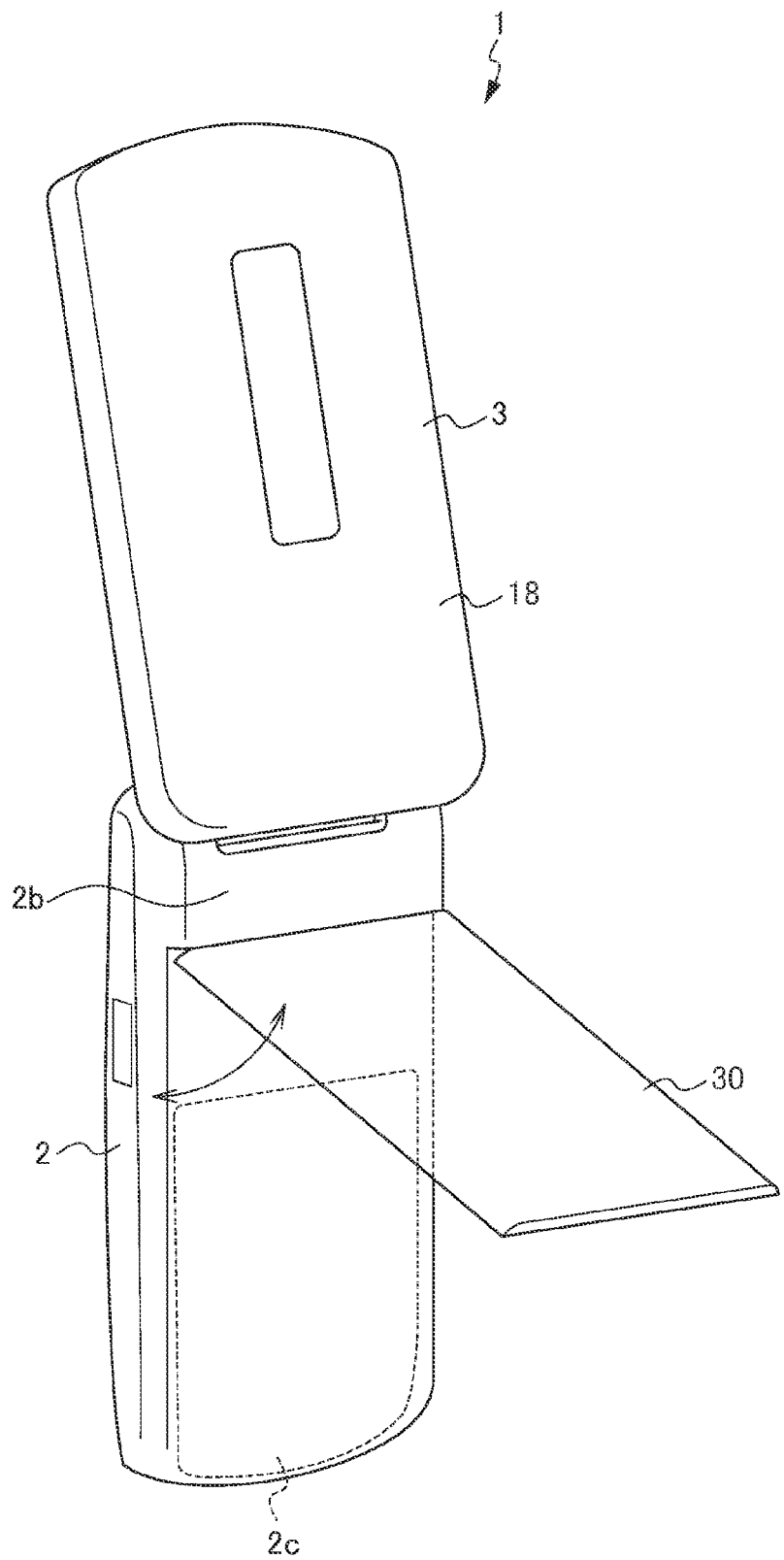
FIG. 6 is view schematically illustrating an appearance when a first case member is connected to the operation unit side body.

In addition, with the cellular telephone device 1, it is preferable for the first case member 30 to be a configuration connected to the operation unit side body 2 to be relatively movable in relation to the operation unit side body 2. More specifically, the first case member 30 is a top surface of the battery lid 2c, which houses a rechargeable battery in the rear case 2b (surface on which the operation unit 11 is not arranged) of the operation unit side body 2, and is connected to allow one end side to move relative to the operation unit side body 2, as shown in FIG. 6. In addition, the connection member connecting the operation unit side body 2 and the first case member 30 is configured by a mechanism allowing for angular adjustment. Therefore, the first case member 30 can be adjusted to a predetermined angle with reference to a plane of the operation unit side body 2.

Consequently, by causing the first case member 30 to relatively move in relation to the operation unit side body 2, the cellular telephone device 1 is able to adjust antenna characteristics as in a rod antenna externally mounted, and thus can achieve more effective utilization of the first case member 30. In addition, since the first case member 30 can be made to function also as a support member supporting the operation unit side body 2, for example, the cellular telephone device 1 can be stably placed on a desk or the like.

Furthermore, in the cellular telephone device 1, it is preferable for the first case member 30 to be formed from metal. By configuring in this way, the cellular telephone device 1 can also achieve an improvement in the strength of the operation unit side body 2 from the first case member 30 being formed from metal.

Figure 7:
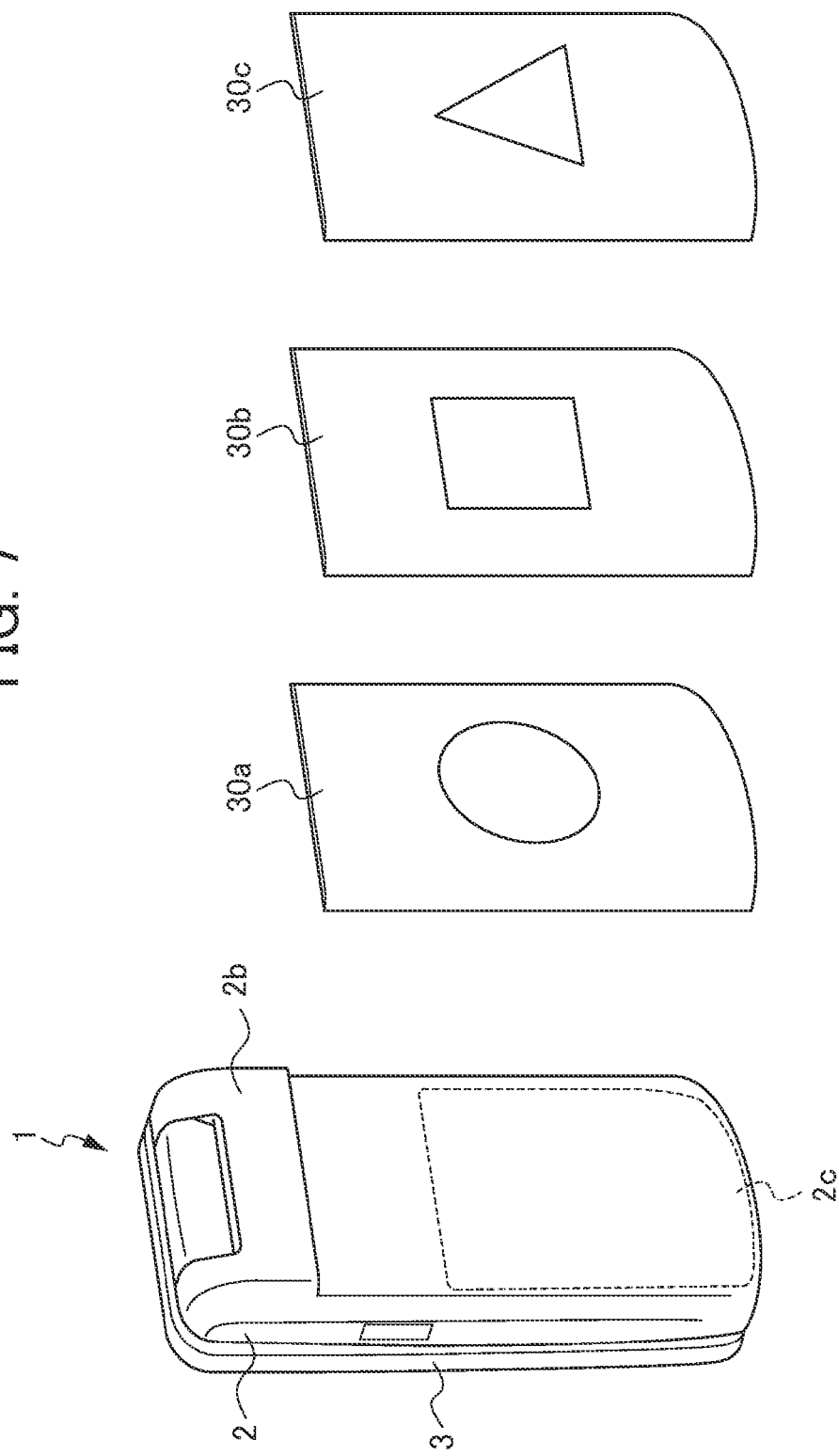
FIG. 7 is a view schematically illustrating variations of the first case member.

In addition, with the cellular telephone device 1, it is preferable for the first case member 30 to be a decorated case. For example, for the first case member 30, there is a case member 30a, a case member 30b, a case member 30c and the like differing in design, as shown in FIG. 7. Therefore, a user can arbitrarily exchange the first case member 30 according to their personal taste or usefulness in an application.

By being configured in this way, the cellular telephone device 1 can achieve effective utilization of the first case member 30 due to a decorated case configured to be detachable with the object of improving the design properties being used as the first conductive portion 34.

In addition, with the cellular telephone device 1, electrical conduction between the operation unit side body 2 and the display unit side body 3 is achieved by means of a thin coaxial cable, flexible cable or the like through the hinge mechanism 4. Therefore, in a case of the circuit portion 33 being disposed in the display unit side body 3, the electrical connection to the operation unit side body 2 is achieved using the thin coaxial cable, flexible cable or the like.

Second Embodiment

Next, a second embodiment will be explained. Although a case of the first case member 30 being formed in the operation unit side body 2 has been explained in the first embodiment, a case of a second case member 43, which shares the use, function and form with the first case member 30, being formed in the display unit side body 3 will be explained in the second embodiment.

Figure 8:
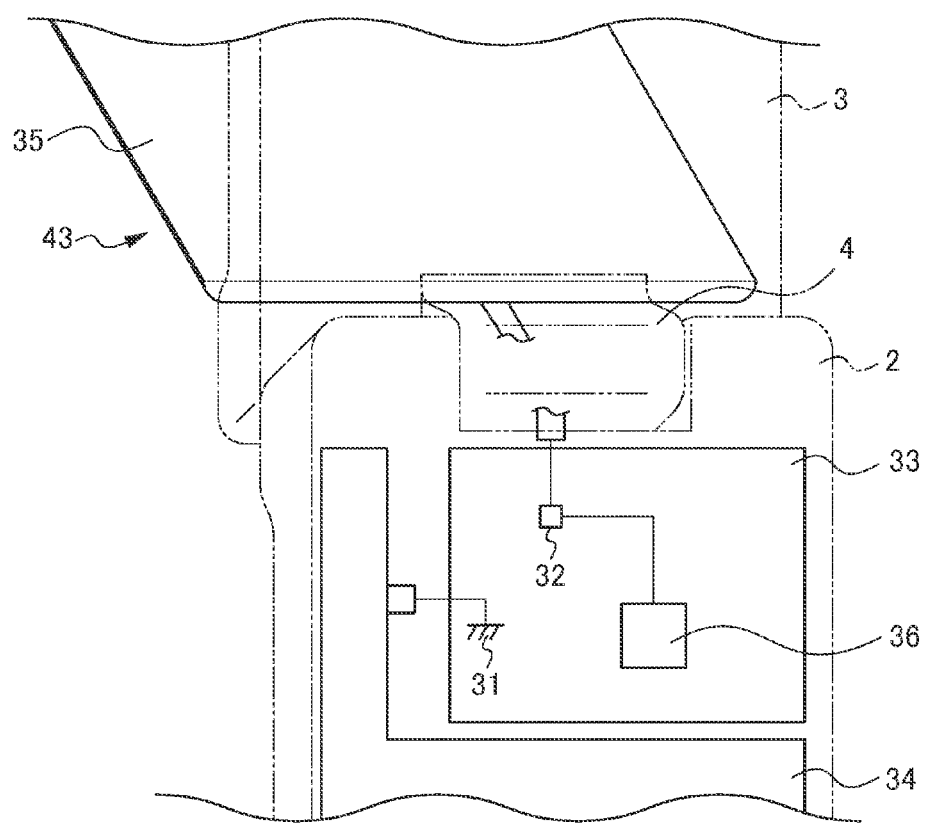
FIG. 8 is a view schematically illustrating a third configuration of the cellular telephone device according to the present embodiment.

The cellular telephone device 1 includes the operation unit side body 2, the display unit side body 3, the circuit portion 33, the first conductive portion 34, and the second conductive portion 35, as shown in FIG. 8. It should be noted that the first conductive portion 34 is configured by the conductive members or the like forming the ground pattern of a circuit board that is not illustrated, a shielding case, and the operation unit side body 2, for example.

The display unit side body 3 has the second case member 43 forming the exterior thereof. The circuit portion 33 is arranged in either one of the operation unit side body 2 and the display unit side body 3, and includes the grounding portion 31, electric power supply portion 32 and the signal processing unit 36. The signal processing unit 36 establishes the same potential as the grounding portion 31 so that there is no influence on the antenna characteristics. The first conductive portion 34 is disposed in the operation unit side body 2, and is electrically connected to the grounding portion 31. The second conductive portion 35 is disposed in the display unit side body 3, and is formed in the second case member 43 to be electrically connected to the electric power supply portion 32. In addition, signals supplied to the electric power supply portion 32 are supplied to the signal processing unit 36 configured to include an RF circuit, and predetermined processing is executed thereon. Furthermore, the entirety of the second case member 43 may be formed by the second conductive portion 35, or a portion thereof may be formed by the second conductive portion 35.

According to such a configuration, the second case member 43 realizes a function as a radiating element of the antenna due to being electrically connected to the electric power supply portion 32 via the second conductive portion 35. In addition, the operation unit side body 2 realizes a function as a grounding portion of the antenna due to being connected to the grounding portion 31 via the first conductive portion 34.

Therefore, since the cellular telephone device 1 can employ the second case member 43 forming the exterior of the display unit side body 3 as the radiating element of the antenna, simplification is possible in a case of configuring a body dipole antenna, without there leading to complication of the body internal structure. In addition, since the cellular telephone device 1 employs the second case member 43 forming the exterior of the display unit side body 3 as the radiating element of the antenna, an improvement in antenna characteristics can be achieved compared to a case of the radiating element of the antenna being disposed inside of the display unit side body 3.

It should be noted that, although it has been explained above that the grounding portion 31 is provided to the circuit portion 33, and the first conductive portion is electrically connected to the grounding portion 31, it is not limited thereto. So long as the grounding portion 31 and the first conductive portion 34 are the same potential, the first conductive portion 34 may not be directly connected to the grounding portion 31.

Figure 9:
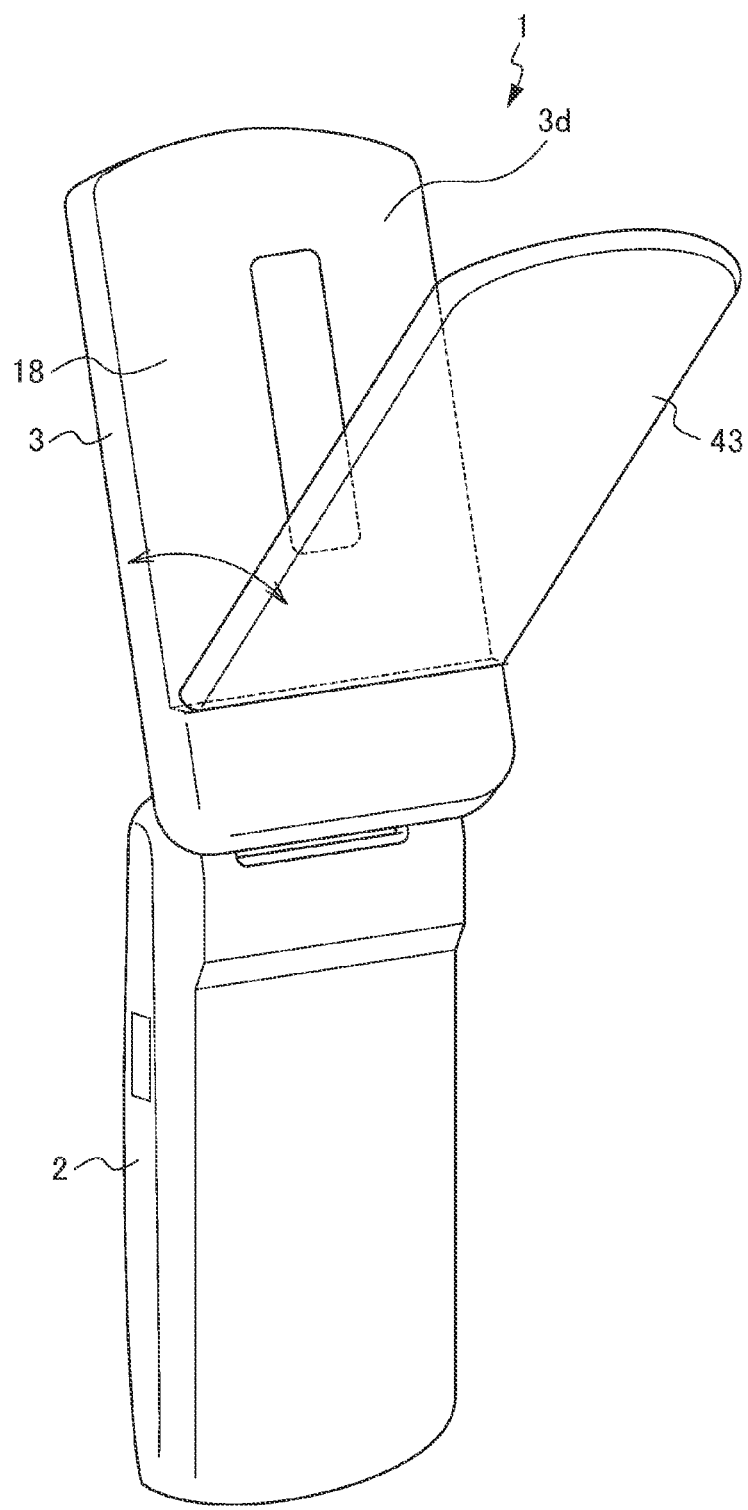
FIG. 9 is a view schematically illustrating an appearance when a second case member is connected to the display unit side body.

In addition, with the cellular telephone device 1, it is preferable for the second case member 43 to be a configuration connected to the display unit side body 3 to be relatively movable in relation to the display unit side body 3. More specifically, the second case member 43 is a top surface of the rear panel 3d of the display unit side body 3 (surface on which the display 21 is not arranged), and is connected to allow one end side to move relative to the display unit side body 3, as shown in FIG. 9. In addition, the connection member connecting the display unit side body 3 and the second case member 43 is configured by a mechanism allowing for angular adjustment. Therefore, the second case member 43 can be adjusted to a predetermined angle with reference to a plane of the operation unit side body 2.

Consequently, by causing the second case member 43 to relatively move in relation to the display unit side body 3, the cellular telephone device 1 is able to adjust antenna characteristics as in a rod antenna externally mounted, and thus can achieve more effective utilization of the second case member 43. In addition, since the second case member 43 can be made to function also as a support member supporting the display unit side body 3, for example, the cellular telephone device 1 can be stably placed on a desk or the like.

Furthermore, in the cellular telephone device 1, it is preferable for the second case member 43 to be formed from metal. Therefore, the cellular telephone device 1 can also achieve an improvement in the strength of the display unit side body 3 from the second case member 43 being formed from metal.

Figure 10:
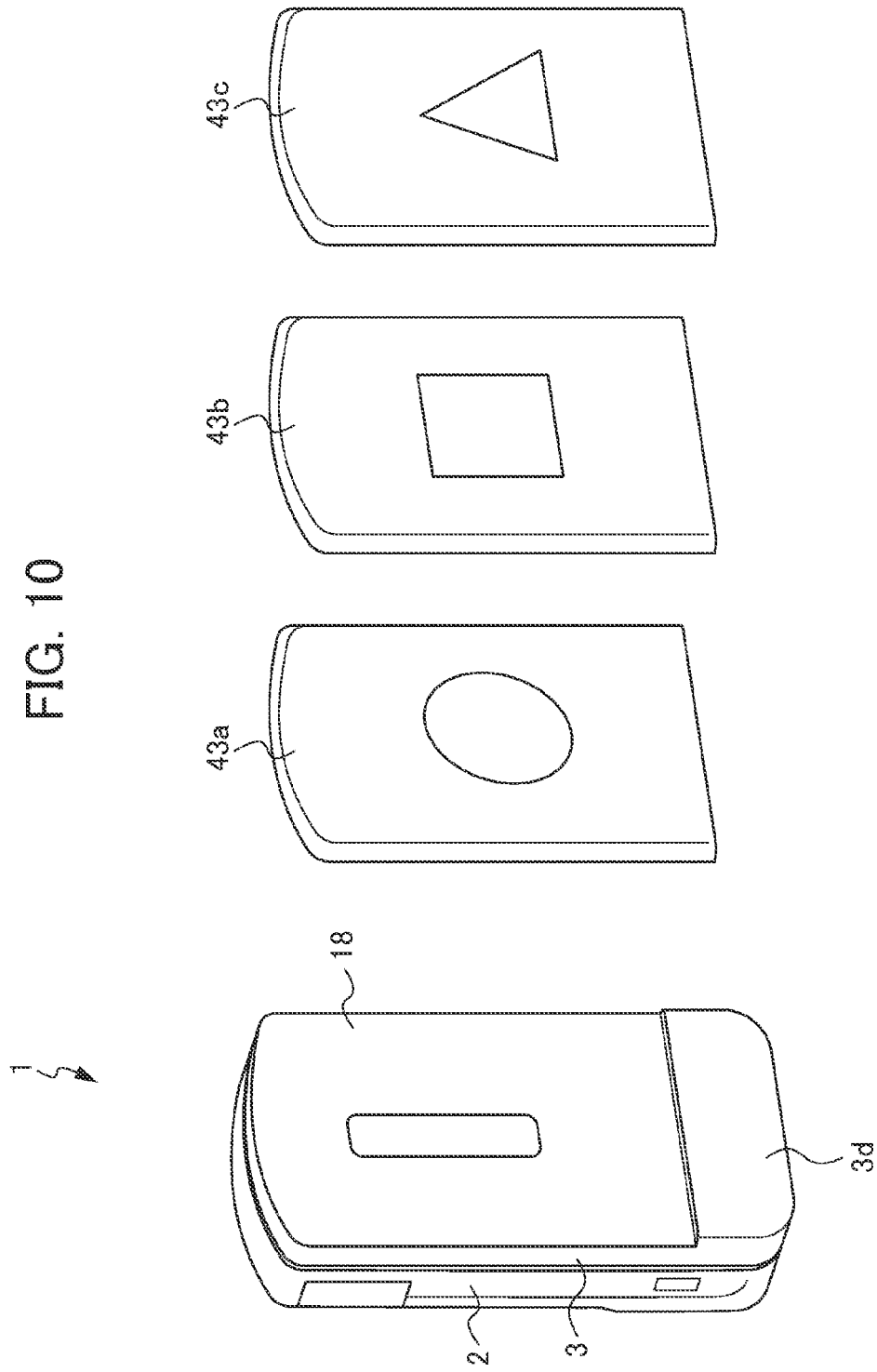
FIG. 10 is a view schematically illustrating variations of the second case member.

In addition, with the cellular telephone device 1, it is preferable for the second case member 43 to be a decorated case. For example, for the second case member 43, there is a case member 43a, a case member 43b, a case member 43c and the like differing in design, as shown in FIG. 10. Therefore, a user can arbitrarily exchange the second case member 43 according to their personal taste or usefulness in an application.

By being configured in this way, the cellular telephone device 1 can achieve effective utilization of the second case member 43 due to a decorated case configured to be detachable with the object of improving the design properties being used as the first conductive portion 34.

Third Embodiment

Figure 11:
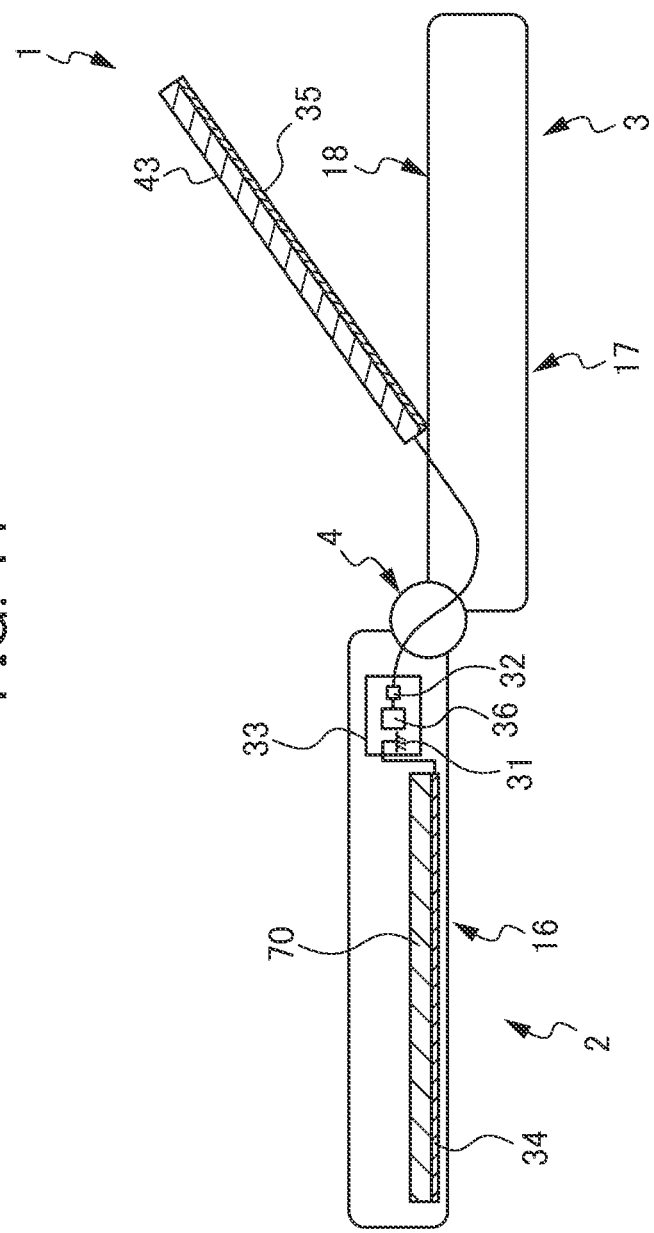
FIG. 11 is a view schematically illustrating a fourth configuration of the cellular telephone device according to the present embodiment.
Figure 12:
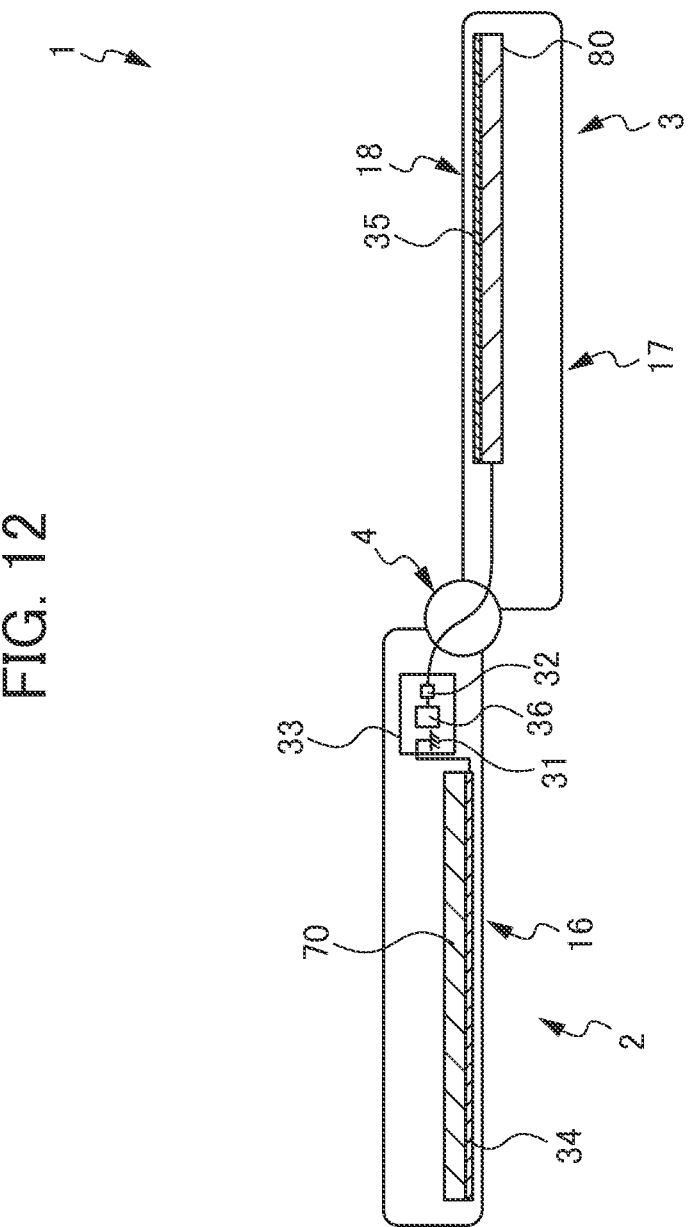
FIG. 12 is a view schematically illustrating a fifth configuration of the cellular telephone device according to the present embodiment.

Next, a third embodiment will be explained. The specific configuration thereof is the configuration explained in the second example. In the present embodiment, the first conductive portion 34 (circuit board 70) is arrange on an operation surface 16 side of the operation unit side body 2, as shown in FIG. 11. In addition, the second conductive portion 35 is formed in the second casing member 43. Specifically, the second conductive portion 35 is arranged on a surface side of the display unit side body 3 opposite to the display surface 17 (exterior surface 18 side of rear case 3c).

Herein, although the operation unit side body 2 is held by a user when operating the cellular telephone device 1, the rear case 2b side of the operation unit side body 2 is covered by a hand of the user at this time. In addition, in a case of carrying out a voice call by way of the cellular telephone device 1, since the user touches their ear to the display surface 17 side of the display unit side body 3, the display surface 17 side of the display unit side body 3 is covered by the head of the user. Accordingly, in the present embodiment, the first conductive portion 34 is arranged on the operating surface 16 side which is not easily covered by the hand (body) of the user, while the second conductive portion 35 is arranged on the external surface 18 side of the rear case 3c, which is a side opposite to the display surface 17 that is not easily covered by the head (body) of the user. By being configured in this way, the cellular telephone device 1 can dispose the first conductive portion 34 and the second conductive portion 35 at positions separated from the body of the user during use of the cellular telephone device 1. Therefore, a decline in the antenna reception caused by the presence of the body of the user can be suppressed.

It should be noted that, in a case of the cellular telephone device 1 in which the second case member 43 is not disposed in the display unit side body 3, the second conductive portion 35 may be formed in a circuit board 80 housed in the display unit side body 3. In this case, it is preferable for the circuit board 80 to be arranged on the external surface 18 side of the rear case inside of the display unit side body 3. In addition, although the first conductive portion 34 is connected to the electric power supply portion 32 and the second conductive portion 35 is connected to the grounding portion 31 in the present embodiment, it is not limited thereto. Specifically, the first conductive portion 34 may be connected to the grounding portion 31, and the second conductive portion 35 may be connected to the electric power supply portion 32. In this case, the second conductive portion 35 realizes a function as a radiating element of the antenna, and the first conductive portion 34 realizes a function as a grounding portion of the antenna.

Fourth Embodiment

Figure 13:
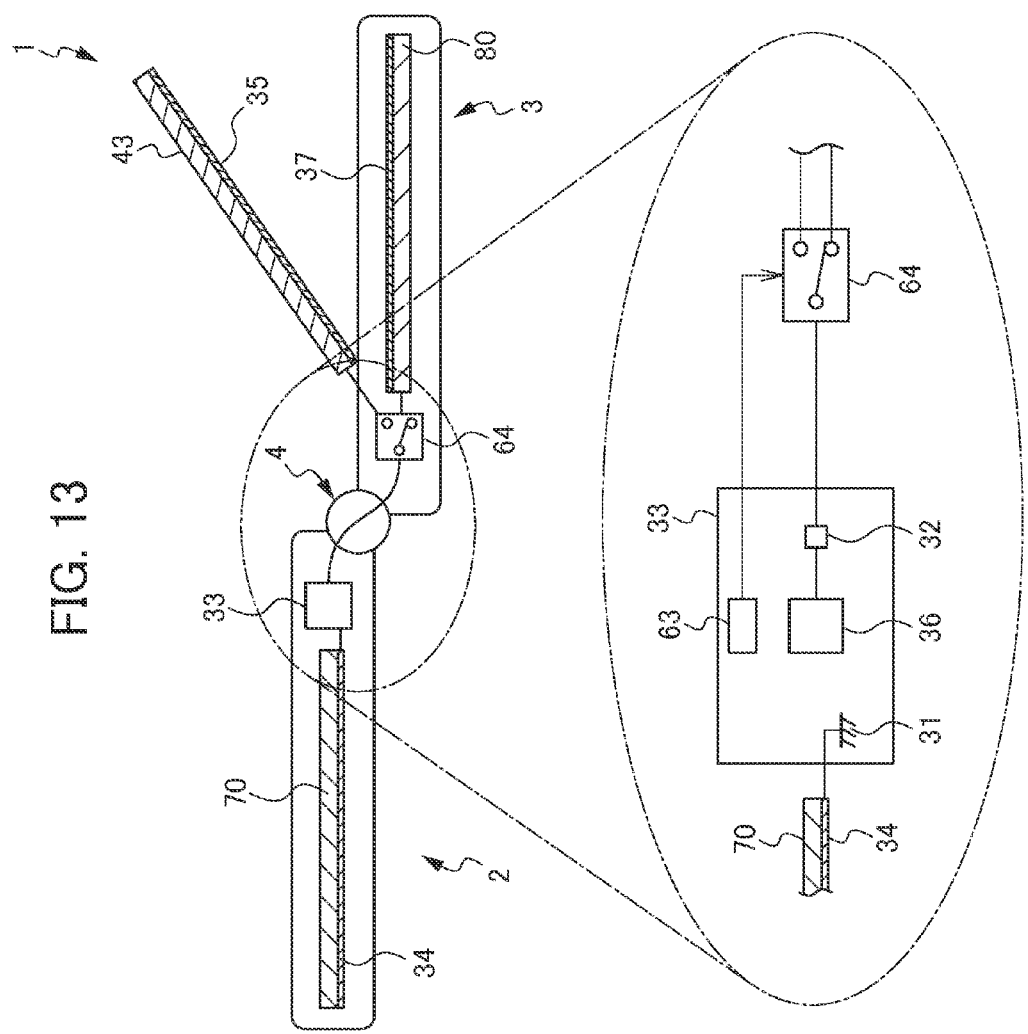
FIG. 13 is a view schematically illustrating a sixth configuration of the cellular telephone device according to the present embodiment.

Next, a fourth embodiment will be explained. The specific configuration thereof is the configuration explained in the second embodiment. The second conductive portion 35 is formed in the circuit portion 80 housed in the display unit side body 3 and the second case member 43. In addition, the cellular telephone device 1 includes a selector switch 64 as a selector portion configured to be able to select a contact state in which the second case member 43 and the electric power supply portion 32 are connected, or a contact state in which the circuit board 80 and the electric power supply portion 32 are connected, and a control unit 63 that controls selection of the contact state by way of this selector switch 64, as shown in FIG. 13.

In addition, the circuit board 70 housed in the operation unit side body 2 is electrically connected to the grounding portion 31 and thus realizes a function as a grounding portion of the antenna. Furthermore, the second case member 43 and the circuit board 80 are both electrically connected to the electric power supply portion 32 via the selector switch 64 and realize a function as radiating elements of the antenna.

Herein, operation of the control unit 63 will be explained. The control unit 63 controls the selector switch 64 in order to set the second case member 43 as a radiating element of the antenna, connects the second conductive portion 35 related to the second case member 43 to the signal processing unit 36, and detects a resonance sensitivity A. In addition, the control unit 63 controls the selector switch 64 in order to set the circuit board 80 as the radiating element of the antenna, connects the second conductive portion 35 related to the circuit board 80 to the signal processing unit 36, and detects a resonance sensitivity B. The control unit 63 compares the resonance sensitivity A with the resonance sensitivity B, and controls the selector switch 64 so that the second case member 43 becomes a radiating element of the antenna in a case of the resonance sensitivity A being higher than the resonance sensitivity B, and controls the selector switch 64 so that the circuit board 80 becomes a radiating element of the antenna in a case of the resonance sensitivity A being lower than the resonance sensitivity B. It should be noted that the control unit 63 executes the comparison between the resonance sensitivity A and the resonance sensitivity B at a predetermined time interval (e.g., interval for performing intermittent reception performed at predetermined period).

Therefore, since control by the control unit 63 is performed during intermittent reception performed at the predetermined period, it is not necessary to supply electric power only to execute operation of the control unit 63 according to the present embodiment, and thus the cellular telephone device 1 can achieve a power savings. In addition, the cellular telephone device 1 can continuously suppress a decline in antenna characteristics due to control being performed at a predetermined period.

In addition, the control unit 63 may be a configuration that switches the selector switch 64 based not on the resonance sensitivity, but rather on the contact state, temperature change or brightness change. More specifically, the cellular telephone device 1 includes a detection unit (not illustrated) that detects a contact state, temperature change or brightness change.

Detection of Contact State

In order to detect contact by the user, the detection unit arranges a detection element that is a touch sensor at the entirety of the display unit side body 3 and the second case member 43, and detects contact of the user by way of the detection element. The control unit 63 controls the selector switch 64 so that the circuit board 80 becomes the radiating element of the antenna, in a case of having detected that the second case member 43 is contacted by way of the detection unit. In addition, the control unit 63 controls the selector switch 64 so that the second case member 43 becomes the radiating member of the antenna in a case of having detected that the display unit side body 3 is contacted by way of the detection unit.

Detection of Temperature Change

In addition, in order to detect contact by the user, the detection unit arranges a detection element that is a temperature sensor at a predetermined portion of the display unit side body 3 and second case member 43 (portion likely to be contacted by user), and detects a temperature change by way of the detection element. The control unit 63 controls the selector switch 64 so that the circuit board 80 becomes the radiating element of the antenna in a case of having detected that the second case member 43 is a temperature within a predetermined temperature range (e.g., 30° C. to 40° C.) by way of the detection unit. In addition, the control unit 63 controls the selector switch 64 so that the second case member 43 becomes the radiating element of the antenna in a case of having detected that the display unit side body 3 is a temperature within a predetermined temperature range (e.g., 30° C. to 40° C.) by way of the detection unit.

Detection of Brightness Change

In addition, in order to detect contact by the user, the detection unit arranges a detection element that is a sensor (photosensor) that detects luminance at a predetermined portion of the display unit side body 3 and second case member 43 (portion likely to be contacted by the user), and detects a brightness change by way of the detection element. The control unit 63 controls the selector switch 64 so that the circuit board 80 becomes the radiating element of the antenna in a case of having detected that the periphery of the second case member 43 is a brightness no more than a predetermined brightness by way of the detection unit. In addition, the control unit 63 controls the selector switch 64 so that the second case member 43 becomes the radiating element of the antenna in a case of having detected that the periphery of the display unit side body 3 being a brightness no more than a predetermined brightness by way of the detection unit.

Furthermore, the control unit 63 may be a configuration that switches the selector switch 64 based on a call state of the cellular telephone device 1. In this case, the control unit 63 controls the selector switch 64 so that the second case member 43 becomes the radiating element of the antenna during a normal call (call in a state with the ear of the user pressing against the voice output unit 22 of the display unit side body 3).

By configuring in this way, the cellular telephone device 1 can suppress a decline in antenna characteristics in response to the usage mode of the user, since the radiating element of the antenna is selected based on the contact state, temperature, brightness or call state. In other words, the control unit 63 controls the selector switch 64 so that a portion of the display unit side body 3 positioned at a side separated from the position contacted by the user functions as the antenna element, depending on the contact state to the display unit side body 3 by the user (human body). Therefore, the influences on the antenna due to contact with the human body can be reduced. It should be noted that the cellular telephone device 1 may be a configuration integrally using a touch sensor, temperature sensor and photosensor.

In addition, the control unit 63 may be a configuration that controls the selector switch 64 based on a function of the cellular telephone device 1. In this case, when the one-seg function is running, for example, the control unit 63 controls the selector switch 64 so that the circuit board 80 becomes the radiating element of the antenna, based on the assumption that the second case member 43 is contacting by the user. Furthermore, when the call function is running in a state in which a cable is not inserted in an ear phone connector, the control unit 63 controls the selector switch 64 so that the second case member 43 becomes the radiating element of the antenna, based on the assumption that the display unit side body 3 is contacting by the user (the ear of the user is being pressed against the voice output unit 22 of the display unit side body 3. It is thereby possible to separate a region receiving contact by the user and the second conductive portion 35 functioning as the antenna element as much as possible, and thus a decline in antenna characteristics can be suppressed. In addition, the control unit 63 may be a configuration that controls the selector switch 64 so that the second case member 43 becomes the radiating element of the antenna when the cellular telephone device 1 is mounted to a cradle for recharging.

Alternate Embodiments

Figure 14:
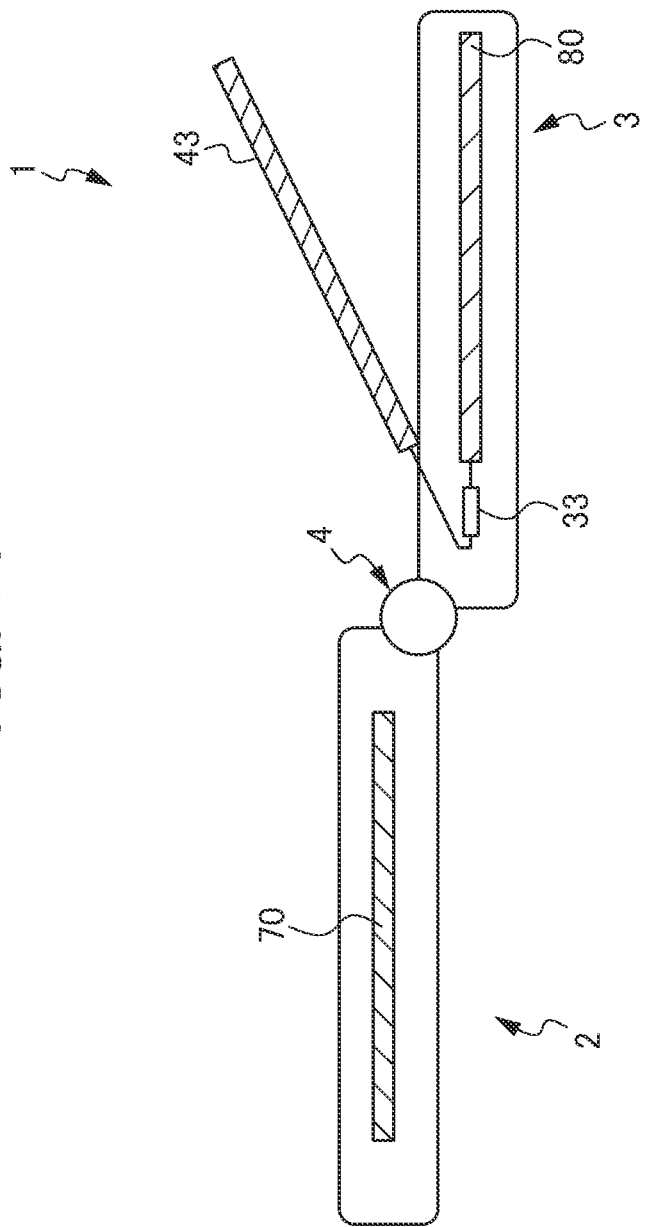
FIG. 14 is a view schematically illustrating a seventh configuration of the cellular telephone device according to the present embodiment.

In addition, the cellular telephone device 1 may be a configuration that arranges the circuit portion 33 configured to include the signal processing unit 36 in the display unit side body 3, and forms the radiating element and the grounding portion of the antenna only in the display unit side body 3, as shown in FIG. 14. In the case of this configuration, the control unit switches so that the circuit board 80 becomes the radiating element of the antenna, and switches so that the second case member 43 becomes the grounding portion of the antenna, and also switches so that the second case member 43 becomes the radiating element of the antenna and switches the circuit board 80 to the grounding portion of the antenna, as required.

By configuring in this way, since high frequency current does not easily flow to the operation unit side body 2, it is possible to avoid deterioration of the antenna characteristics, even if the operation unit side body 2 is covered by a hand or the like of the user.

The invention claimed is:

1. A portable terminal comprising:
    a dipole antenna including a grounding portion and a radiating element;
    a first body including a first case member that forms an exterior;
    a second body;
    a circuit portion disposed in either one of the first body and the second body, and including a ground portion, electric power supply portion, and signal processing unit connected to the electric power supply portion;
    a first conductive portion formed in the first case member, and electrically connected to the ground portion; and
    a second conductive portion disposed in the second body, and electrically connected to the electric power supply portion;
    wherein one side of the first case member is configured to be relatively movable away from the first body in a state the other side of the first case member is connected to the first body;
    wherein the grounding portion of the dipole antenna is the first conductive portion formed in the first case member; and
    wherein the radiating element of the dipole antenna is the second conductive portion.

2. A portable terminal according to claim 1, wherein the first case member is formed from metal.

3. A portable terminal according to claim 1, wherein the first case member is a decoration case.

4. A portable terminal comprising:
    a dipole antenna including a grounding portion and a radiating element;
    a first body;
    a second body including a second case member forming an exterior;
    a circuit portion disposed in either one of the first body and the second body, and including a ground portion, an electric power supply portion, and a signal processing unit connected to the electric power supply portion;
    a first conductive portion disposed in the first body, and electrically connected to the ground portion; and
    a second conductive portion formed in the second case member, and electrically connected to the electric power supply portion;
    wherein the grounding portion of the dipole antenna is the first conductive portion;
    wherein one side of the second case member is configured to be relatively movable away from the second body in a state the other side of the second case member is connected to the second body; and wherein the radiating element of the dipole antenna is the second conductive portion formed in the second case member.

5. A portable terminal according to claim 4, wherein the second case member is formed from metal.

6. A portable terminal according to claim 4, wherein the second case member is a decoration case.

7. A portable terminal comprising:
- a dipole antenna including a grounding portion and a radiating element;
- a first body including an operating surface provided by an operation unit;
- a second body including a display surface provided by a display unit;
- a circuit portion disposed in either one of the first body and the second body, and including a ground portion, an electric power supply portion, and a signal processing unit connected to the electric power supply portion;
- a first conductive portion disposed in the first body at an operating surface side thereof, and electrically connected to either one of the ground portion and the electric power supply portion; and
- a second conductive portion disposed at a surface side of the second body opposite the display surface, and electrically connected to the other one of the ground portion and the electric power supply portion;
- wherein the second body includes a second case member disposed on a surface side thereof opposite to the display surface,
- wherein the grounding portion of the dipole antenna is the first conductive portion;
- wherein one side of the second case member is configured to be relatively movable away from the second body in a state the other side of the second case member is connected to the second body; and
- wherein the radiating element of the dipole antenna is the second conductive portion formed in the second case member.

* * * * *